(12) United States Patent
Alhozaimy et al.

(10) Patent No.: US 12,091,367 B2
(45) Date of Patent: Sep. 17, 2024

(54) METHOD OF CURING REINFORCED CONCRETE

(71) Applicants: Abdulrahman Alhozaimy, Riyadh (SA); Raja Rizwan Hussain, Riyadh (SA); Abdulaziz Al-Negheimish, Riyadh (SA)

(72) Inventors: Abdulrahman Alhozaimy, Riyadh (SA); Raja Rizwan Hussain, Riyadh (SA); Abdulaziz Al-Negheimish, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 17/512,631

(22) Filed: Oct. 27, 2021

(65) Prior Publication Data

US 2023/0278936 A1   Sep. 7, 2023

(51) Int. Cl.
  *C04B 41/45*   (2006.01)
  *C04B 41/00*   (2006.01)
  (Continued)

(52) U.S. Cl.
  CPC ........ *C04B 41/4592* (2013.01); *C04B 41/009* (2013.01); *C04B 41/478* (2013.01); *C04B 41/62* (2013.01)

(58) Field of Classification Search
  CPC . C04B 41/4592; C04B 41/009; C04B 41/478; C04B 41/62
  See application file for complete search history.

(56) References Cited

U.S. PATENT DOCUMENTS 4,644,719 A * 2/1987 Salazar .................... E04C 1/40
                                                        106/712
5,071,579 A * 12/1991 Johnston ............... C23F 11/187
                                                        252/387

(Continued)

FOREIGN PATENT DOCUMENTS

AU           650415 B  *  6/1994  ............... B05D 5/00
JP      2017031796 A  *  2/2017

OTHER PUBLICATIONS

Bigrentz, "Brick Dimensions Guide: Common Shapes and Size", bigrentz.com, published Jul. 30, 2021 (Year: 2021).*

(Continued)

*Primary Examiner* — Alex B Efta
(74) *Attorney, Agent, or Firm* — Nath, Goldberg & Meyer; Joshua B. Goldberg

(57) ABSTRACT

The method of curing reinforced concrete uses a liquid membrane-forming curing compound for the curing of reinforced concrete, but without fully coating the reinforced concrete with the curing compound, thus allowing for oxygen permeation through the reinforced concrete to effect passive layer formation on steel rebar embedded in the reinforced concrete. Prior to curing, a mask is applied to at least one surface of a slab of reinforced concrete, such that the mask covers about 10% of the surface area of the at least one surface. The at least one surface of the slab of reinforced concrete is then coated with a liquid membrane-forming curing compound. The liquid membrane-forming curing compound is allowed to dry, thus forming a curing compound layer on the at least one surface of the slab of reinforced concrete. The mask is then removed to form at least one uncoated region.

4 Claims, 10 Drawing Sheets

(51) Int. Cl.
*C04B 41/47* (2006.01)
*C04B 41/62* (2006.01)

(56) References Cited

U.S. PATENT DOCUMENTS

2009/0162540 A1* 6/2009 Golovkova ........... C04B 41/459
427/154
2014/0079889 A1* 3/2014 Christidis ............... C04B 40/04
252/194

OTHER PUBLICATIONS

Kawashima et al., "JP 2017031796A, machine translation", published Feb. 9, 2017 (Year: 2017).*
"Decorative Concrete Stencils"; printed on Sep. 10, 2021 from https://www.universaltemplates.com/decorative-concrete-stencils/.

* cited by examiner

METHOD OF CURING REINFORCED CONCRETE

BACKGROUND

1. Field

The disclosure of the present patent application relates to the curing of concrete, and particularly to a method of curing reinforced concrete using a liquid membrane-forming curing compound only partially coating the surface of the reinforced concrete.

2. Description of the Related Art

The "curing" of concrete is the process of maintaining adequate moisture in concrete within a proper temperature range in order to aid cement hydration at early ages of the concrete setting and hardening. "Hydration" is the chemical reaction between cement and water that results in the formation of various chemicals contributing to setting and hardening of the concrete. The hydration process is affected by the initial concrete temperature, the ambient air temperature, the dimensions of the concrete, and mix design. Thus, for curing to be effective, in situ concrete must have sufficient moisture and a temperature that favors hydration at a rapid and continuous rate. With respect to reinforced concrete, such as concrete reinforced with steel rebar, curing also assists the concrete to harden and bond with internal materials and any reinforcement. This helps to prevent damage to the bond between the concrete and the reinforcement due to vibration and impact.

Proper curing has a strong influence on the properties of the hardened concrete. Proper curing will result in increased durability, strength, water resistance, corrosion resistance, abrasion resistance, volume stability, and resistance to freezing, thawing and deicing chemicals. Exposed slab surfaces are particularly sensitive to curing, since the strength development and freeze-thaw resistance of the top surface of a concrete slab can be reduced significantly when curing is defective. With proper curing, concrete becomes stronger, has decreased permeability, and increased resistance to stress, abrasion, and freezing and thawing.

Reinforced concrete structures are increasingly susceptible to deterioration caused by chloride-induced corrosion of the embedded steel. Initial curing prior to exposure to a chloride environment plays an important role in the rate of chloride penetration, particularly at the early periods of exposure. Drying of cementitious materials due to poor curing, particularly at the surface, leads to restricted hydration in the surface layers, resulting in higher porosity and permeability. Because chloride ions diffuse through this cover area to reach the reinforcement, curing has an important effect on the diffusivity of the surface layer and, therefore, on the time of corrosion initiation in the concrete.

Traditionally, three curing methods are considered favorable for keeping concrete properly moist and, in some cases, at a favorable temperature. The first method involves maintaining the presence of mixing water in the concrete during the early hardening period. Techniques employed for such maintenance of the mixing water in the concrete include ponding or immersion, spraying or fogging, and the use of saturated wet coverings. These techniques also afford some cooling through evaporation, which is beneficial in hot weather. The second curing method involves reducing the loss of mixing water from the surface of the concrete. This may be performed by covering the concrete with impervious paper or plastic sheets, or by applying membrane-forming curing compounds to the surface of the concrete. The third method seeks to accelerate strength gain by supplying heat and additional moisture to the concrete. This is typically performed using live steam, heating coils, or electrically heated forms or pads.

With regard to the second curing method discussed above, liquid membrane-forming compounds, typically formed from waxes, resins, chlorinated rubber, or other similar materials, may be used to retard or reduce evaporation of moisture from concrete. The use of such compounds is typically viewed as the most practical curing technique, and is very widely used, not only for freshly placed concrete, but also for extending the curing of concrete after removal of the forms or after initial moist curing. Curing compounds, in general, should be able to maintain the relative humidity of the concrete surface above 80% for seven days in order to sustain cement hydration.

Membrane-forming curing compounds are of two general types: clear (or translucent) and white pigmented. Clear or translucent compounds may contain a fugitive dye that makes it easier to check visually for complete coverage of the concrete surface when the compound is applied. The dye then fades away soon after application. Curing compounds are typically applied by hand-operated or power-driven spray equipment immediately after final finishing of the concrete. The concrete surface should be damp when the coating is applied. On dry windy days, or during periods when adverse weather conditions could result in plastic shrinkage cracking, application of a curing compound immediately after final finishing and before all free water on the surface has evaporated will help prevent the formation of cracks. Two coats are typically used to ensure complete coverage. For more effective protection, the second coat should be applied at right angles to the first. Complete coverage of the surface must be attained because even small pinholes in the membrane will increase the evaporation of moisture from the concrete.

When using curing compounds, it should be noted that such compounds might prevent bonding between hardened concrete and a freshly placed concrete overlay. Additionally, most available curing compounds are not compatible with the adhesives used with floor covering materials. Thus, they should either be tested for compatibility, removed, or not used when bonding of overlying materials is necessary. Given the particular importance of curing, it would be desirable to be able to apply a membrane-forming compound to reinforced concrete in a manner which still allows for optimal penetration of oxygen. Thus, a method of curing reinforced concrete solving the aforementioned problems is desired.

SUMMARY

The method of curing reinforced concrete uses a liquid membrane-forming curing compound for the curing of reinforced concrete, but without fully coating the reinforced concrete with the curing compound, thus allowing for oxygen permeation through the reinforced concrete to effect passive layer formation on steel rebar embedded in the reinforced concrete. Prior to curing, a mask is applied to at least one surface of a slab of reinforced concrete, such that the mask covers about 10% of the surface area of the at least one surface. As a non-limiting example, adhesive tape may be used as the mask. The at least one surface of the slab of reinforced concrete is then coated with a liquid membrane-forming curing compound. The liquid membrane-forming curing compound is allowed to dry, thus forming a curing compound layer on the at least one surface of the slab of reinforced concrete. The mask is then removed to form at least one uncoated region on the at least one surface of a slab of reinforced concrete, through which oxygen can permeate into the concrete to effect passive layer formation on the steel rebar embedded in the concrete.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
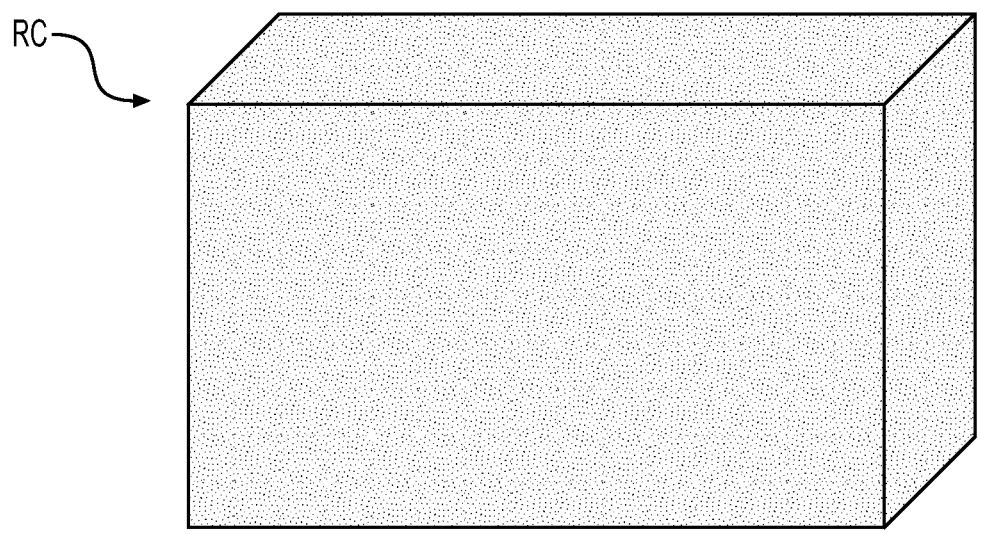
FIG. 1A, FIG. 1B, FIG. 1C, FIG. 1D, and FIG. 1E are diagrammatic perspective views showing successive steps of curing a block or slab of reinforced concrete in a method of curing reinforced concrete.

The method of curing reinforced concrete uses a liquid membrane-forming curing compound for the curing of reinforced concrete, but without fully coating the reinforced concrete with the curing compound, thus allowing for oxygen permeation through the reinforced concrete to effect passive layer formation on steel rebar embedded in the reinforced concrete. It should be understood that the configuration and relative dimensions of the reinforced concrete slab RC shown in FIG. 1A are shown for exemplary purposes only. It should be further understood that the method of curing reinforced concrete is not limited to any particular concrete mixture.

Figure 1B:
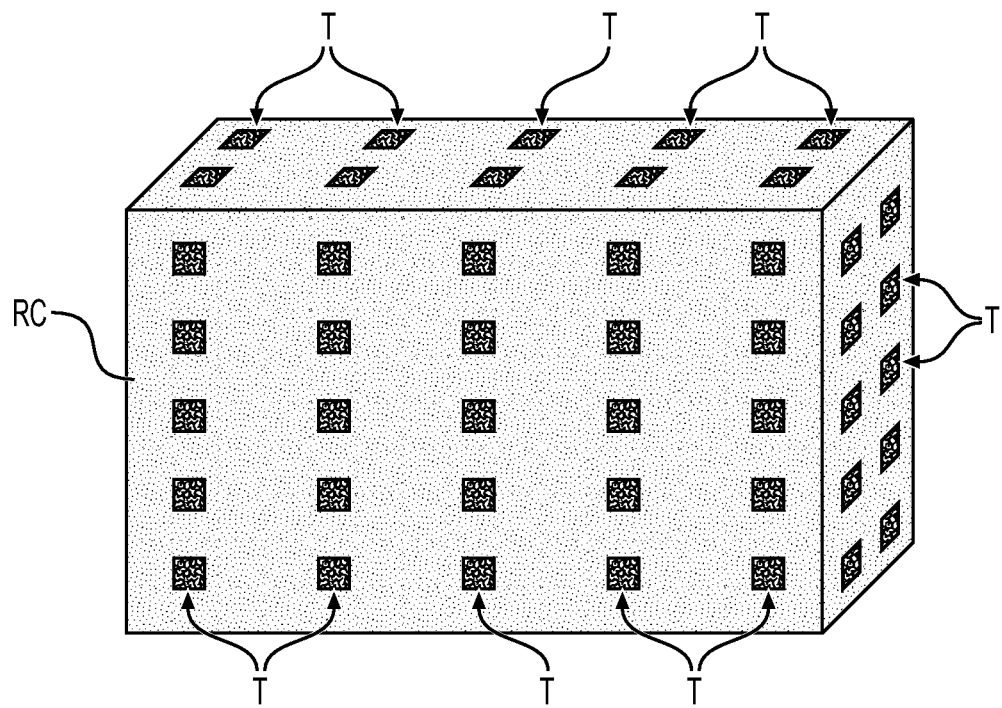

As shown in FIG. 1B, prior to curing, a mask is applied to at least one surface of the slab of reinforced concrete RC, such that the mask covers about 10% of the surface area of the at least one surface. In the non-limiting example of FIG. 1B, a plurality of squares of adhesive tape T are applied to multiple surfaces of the slab of reinforced concrete RC, such that about 10% of the surface area of the slab of reinforced concrete RC is covered. It should be understood that the square shape of the pieces of tape T and the particular arrangement of tape T are shown for exemplary purposes only in FIG. 1B. Another example is shown in FIG. 1F, in which the tape T is applied in multiple strips wrapped around the slab of reinforced concrete RC. It should be further understood that the use of adhesive tape T is only one example of a mask material, and that any suitable type of mask may be used. It should also be understood that any desired number of surfaces of the slab of reinforced concrete RC may be masked, and that the coverage of all surfaces in FIGS. 1B and 1F is shown for exemplary purposes only.

Figure 1C:
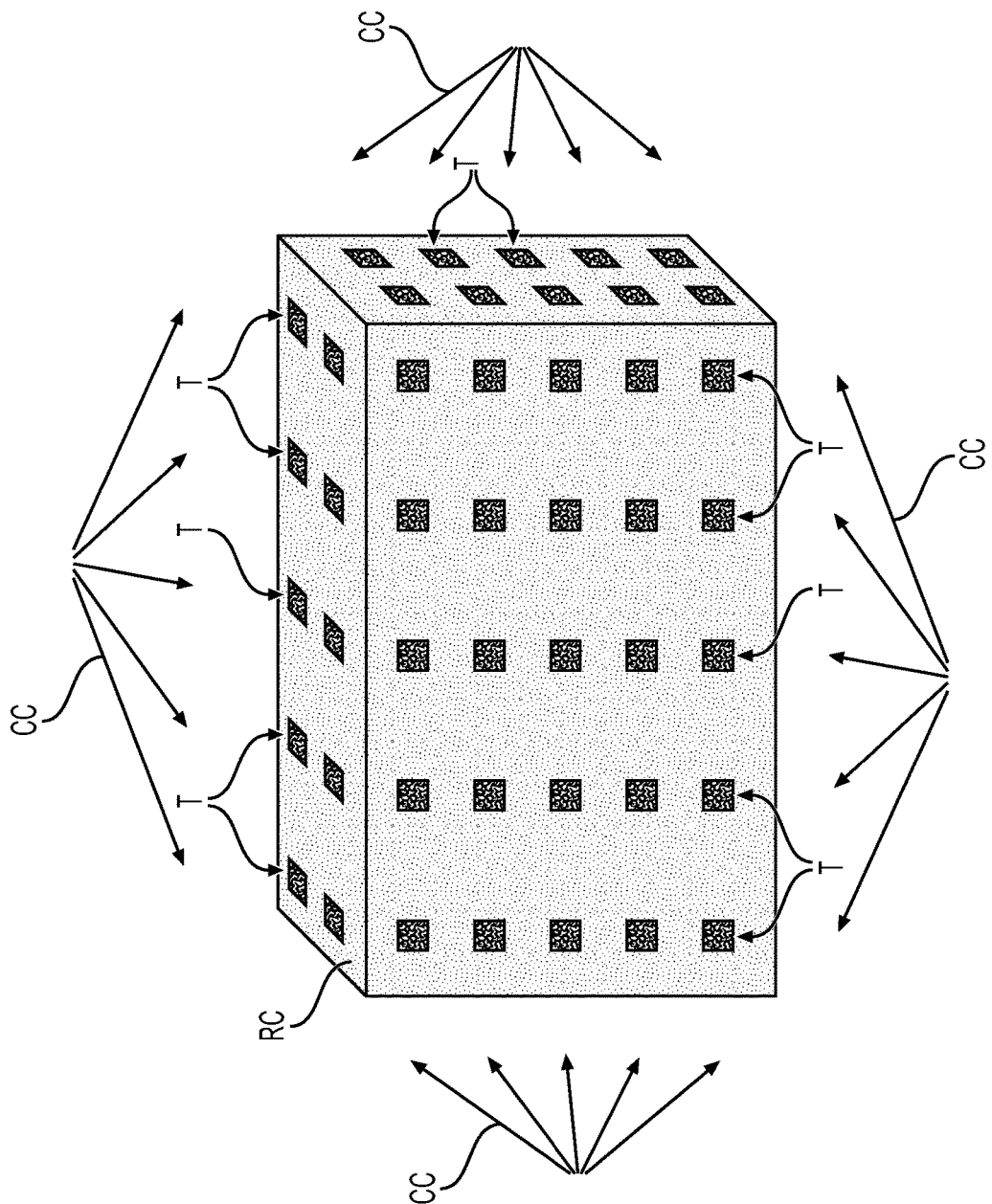
Figure 1D:
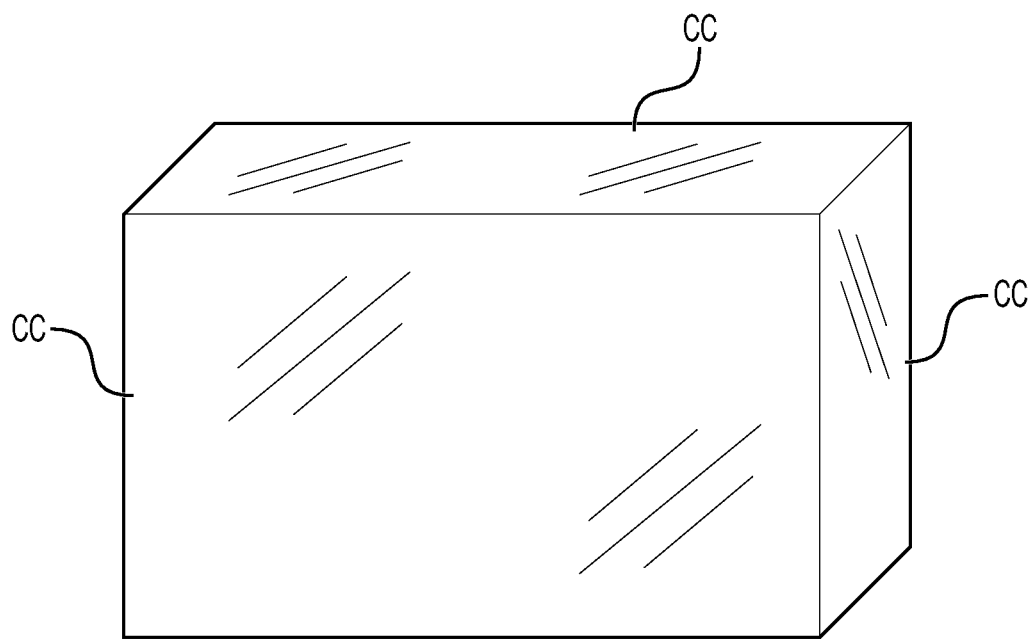
Figure 1E:
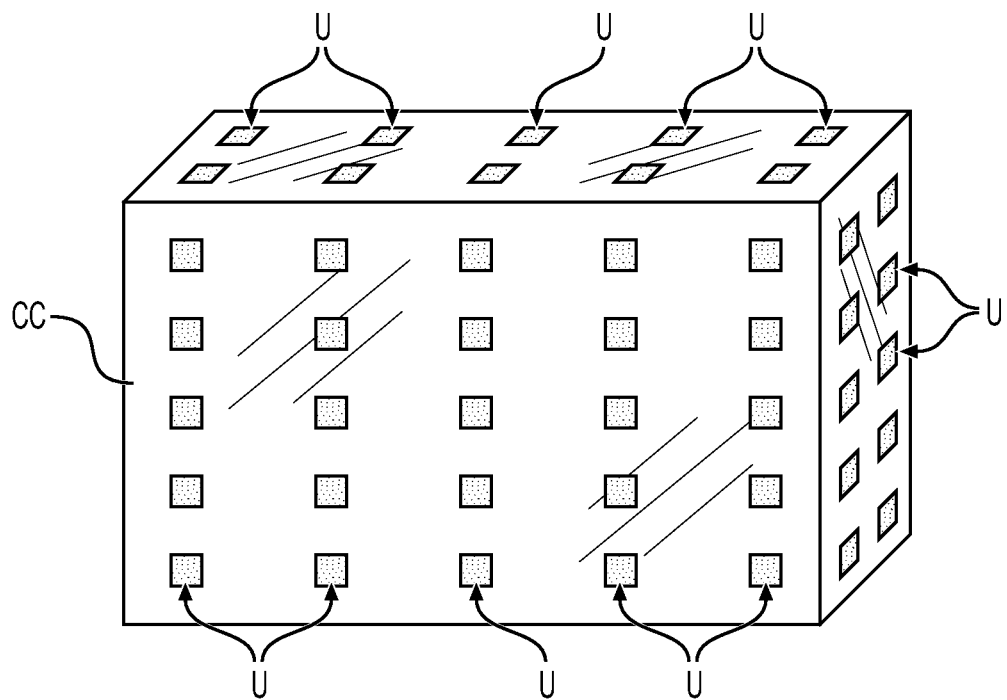
Figure 1F:
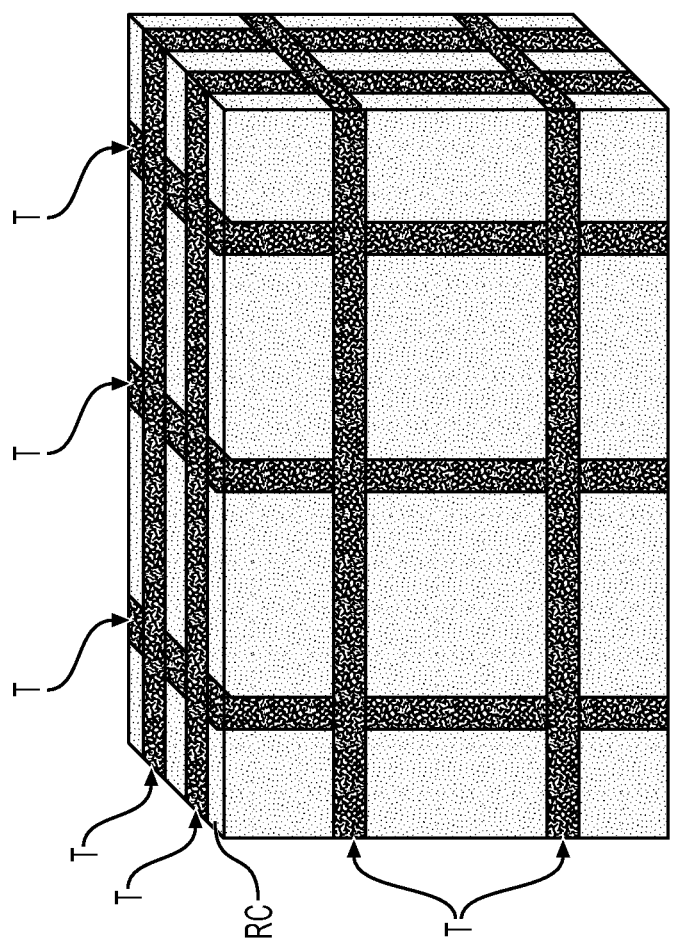
FIG. 1F is a diagrammatic perspective views showing an alternative mask configuration in the method of curing reinforced concrete.

As shown in FIG. 1C, following application of the mask, the at least one surface of the slab of reinforced concrete RC is coated with a liquid membrane-forming curing compound CC. In FIG. 1C, the liquid membrane-forming curing compound CC is shown being sprayed on the slab of reinforced concrete RC. However, it should be understood that the spraying is shown for exemplary purposes only and that any other suitable method of application, such as painting, dipping, or the like may be used. The liquid membrane-forming curing compound CC is allowed to dry, thus forming a curing compound layer CC on the at least one surface of the slab of reinforced concrete RC. In FIG. 1D, the curing compound layer CC is shown as being transparent. However, it should be understood that the choice of a transparent curing compound is shown in FIG. 1D for exemplary purposes only, and that any suitable type of curing compound, including opaque curing compounds, may be used. As shown in FIG. 1E, the mask is then removed to form at least one uncoated region U on the at least one surface of a slab of reinforced concrete RC. The at least one uncoated region U allows environmental oxygen to permeate into the concrete to effect passive layer formation on the steel rebar embedded in the reinforced concrete RC.

As will be explained in detail below, in order to test the method of curing reinforced concrete, reinforced concrete slabs were prepared, including (a) control specimens, which were completely uncoated and unsealed, and which were cured using the wet burlap water-sprinkling method (indicated as "Unsealed" in FIGS. 2A-4B); (b) specimens that were fully sealed within a wrapping of plastic (indicated as "Sealed" in FIGS. 2A-4B); (c) specimens that were completely submerged in water (indicated as "Sub" in FIGS. 2A-4B); (d) specimens that were fully coated with a paraffin emulsion-based liquid membrane-forming curing compound (indicated as "C1" in FIGS. 2A-4B); (e) specimens that were fully coated with a bitumen-based liquid membrane-forming curing compound (indicated as "C2" in FIGS. 2A-4B); (f) specimens that were fully coated with a wax-based liquid membrane-forming curing compound (indicated as "C3" in FIGS. 2A-4B); (g) specimens that were 90% coated with the paraffin emulsion-based liquid membrane-forming curing compound (indicated as "C1 90%" in FIGS. 2A-4B); (h) specimens that were 90% coated with the bitumen-based liquid membrane-forming curing compound (indicated as "C2 90%" in FIGS. 2A-4B); and (i) specimens that were 90% coated with the wax-based liquid membrane-forming curing compound (indicated as "C3 90%" in FIGS. 2A-4B).

Figure 2A:
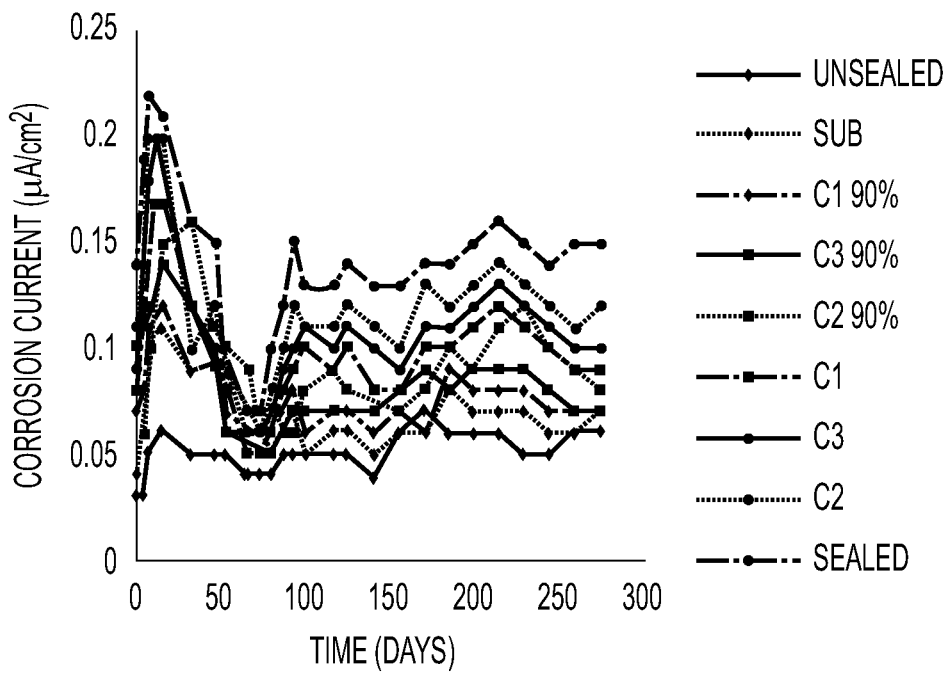
FIG. 2A is a plot of corrosion current as a function of time (in days) for reinforced concrete samples treated by the method of curing reinforced concrete, including samples using different curing compounds, samples fully coated with the different curing compounds, for an entirely sealed sample, for a sample submerged in water, and for a completely uncoated control sample, where each reinforced concrete sample has a water-to-cement (W/C) ratio of 0.3 and was subjected to an admixed threshold total chloride content of 0.4%.
Figure 2B:
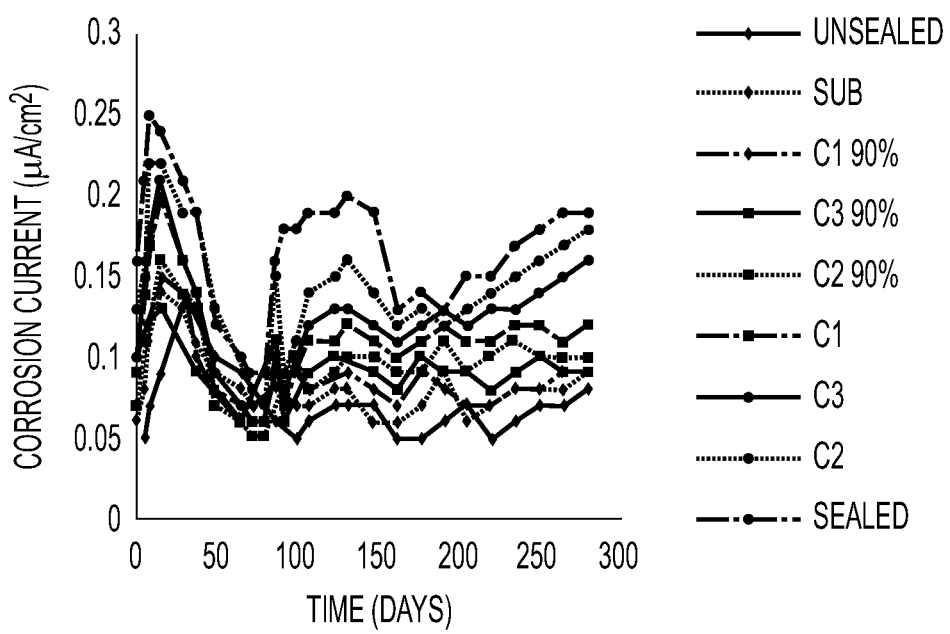
FIG. 2B is a plot of corrosion current as a function of time (in days) for reinforced concrete samples treated by the method of curing reinforced concrete, including samples using different curing compounds, samples fully coated with the different curing compounds, for an entirely sealed sample, for a sample submerged in water, and for a completely uncoated control sample, where each reinforced concrete sample has a water-to-cement (W/C) ratio of 0.45 and was subjected to an admixed threshold total chloride content of 0.4%.
Figure 2C:
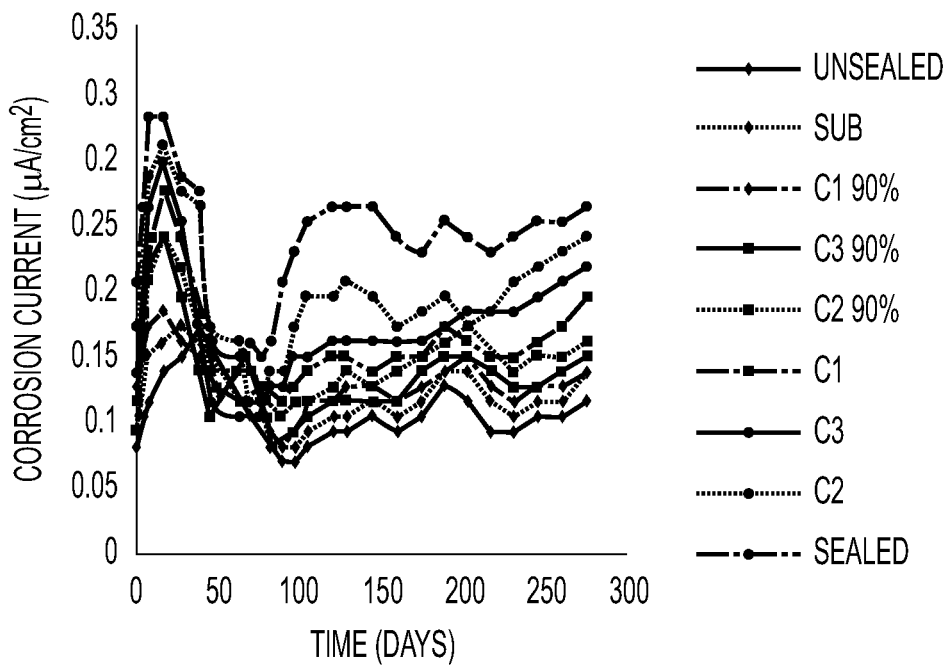
FIG. 2C is a plot of corrosion current as a function of time (in days) for reinforced concrete samples treated by the method of curing reinforced concrete, including samples using different curing compounds, samples fully coated with the different curing compounds, for an entirely sealed sample, for a sample submerged in water, and for a completely uncoated control sample, where each reinforced concrete sample has a water-to-cement (W/C) ratio of 0.6 and was subjected to an admixed threshold total chloride content of 0.4%.
Figure 3A:
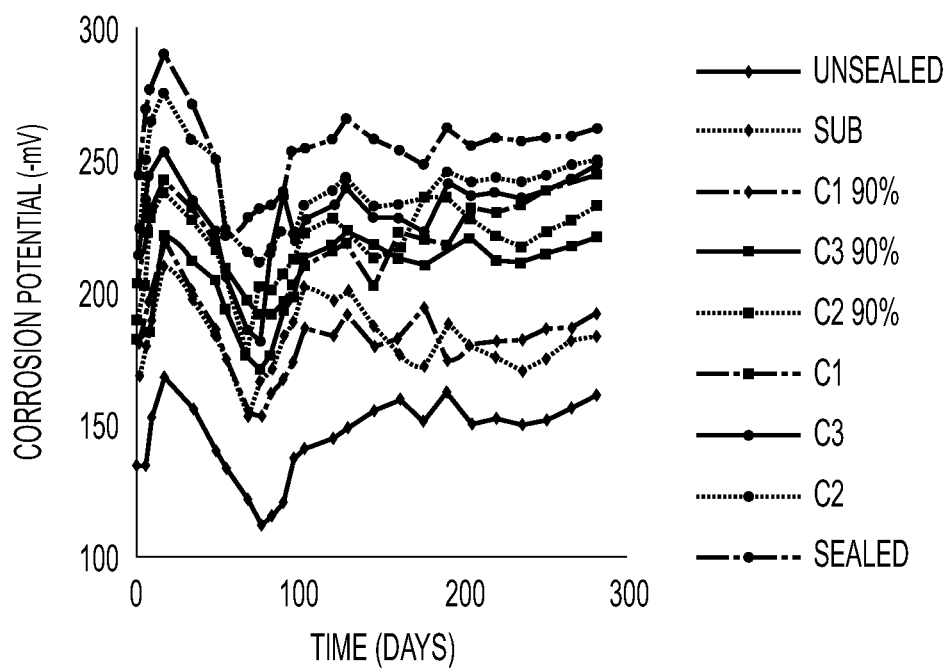
FIG. 3A is a plot of corrosion potential as a function of time (in days) for reinforced concrete samples treated by the method of curing reinforced concrete, including samples using different curing compounds, samples fully coated with the different curing compounds, for an entirely sealed sample, for a sample submerged in water, and for a completely uncoated control sample, where each reinforced concrete sample has a water-to-cement (W/C) ratio of 0.3 and was subjected to an admixed threshold total chloride content of 0.4%.
Figure 3B:
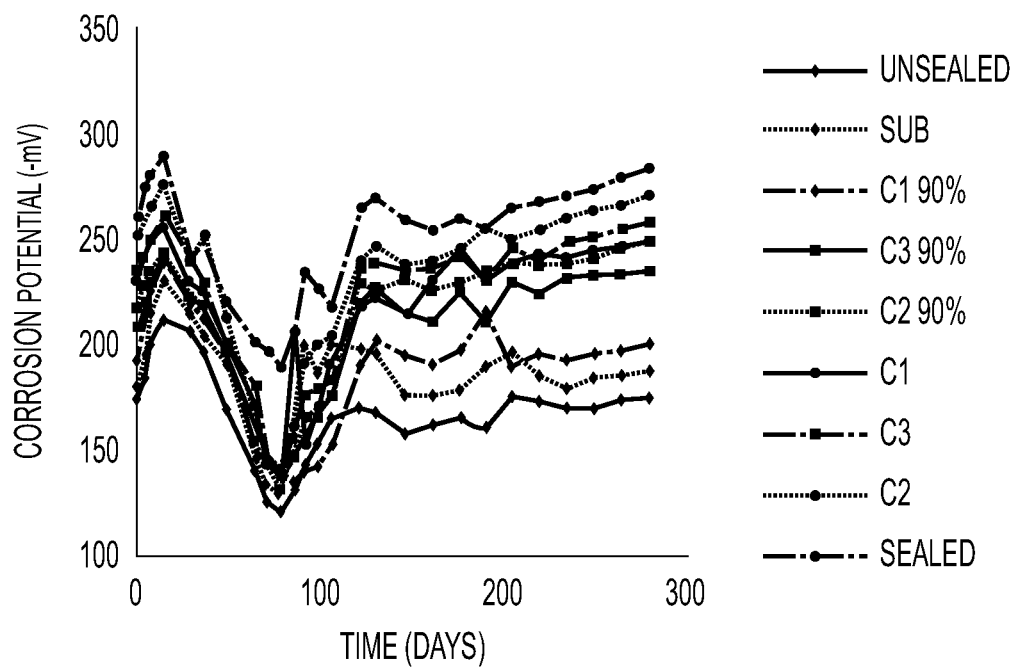
FIG. 3B is a plot of corrosion potential as a function of time (in days) for reinforced concrete samples treated by the method of curing reinforced concrete, including samples using different curing compounds, samples fully coated with the different curing compounds, for an entirely sealed sample, for a sample submerged in water, and for a completely uncoated control sample, where each reinforced concrete sample has a water-to-cement (W/C) ratio of 0.45 and was subjected to an admixed threshold total chloride content of 0.4%.
Figure 3C:
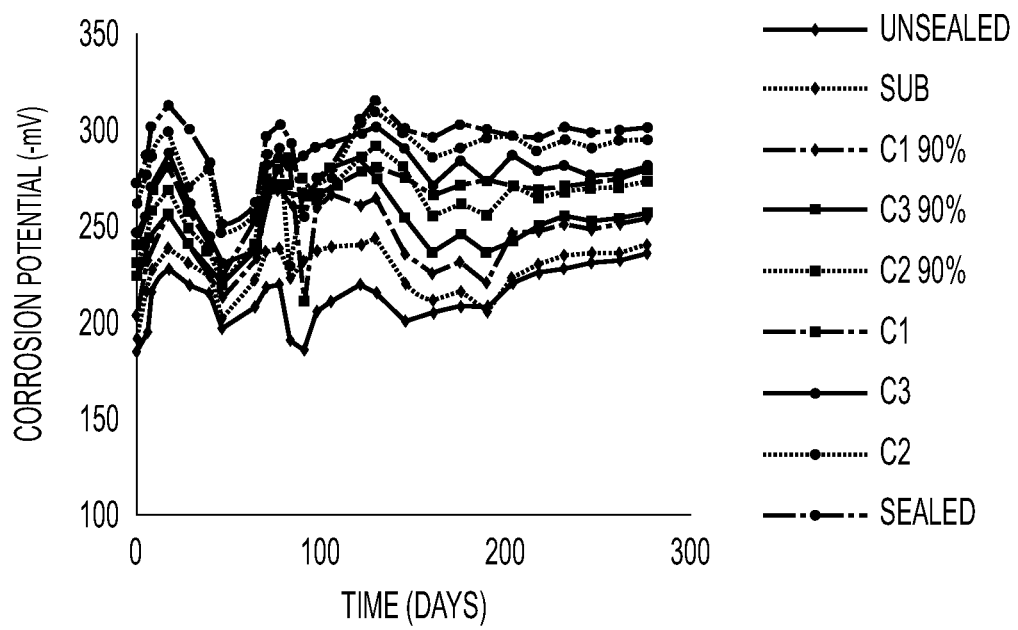
FIG. 3C is a plot of corrosion potential as a function of time (in days) for reinforced concrete samples treated by the method of curing reinforced concrete, including samples using different curing compounds, samples fully coated with the different curing compounds, for an entirely sealed sample, for a sample submerged in water, and for a completely uncoated control sample, where each reinforced concrete sample has a water-to-cement (W/C) ratio of 0.6 and was subjected to an admixed threshold total chloride content of 0.4%.

For the results of FIGS. 2A-3C, each reinforced concrete specimen was shaped as a rectangular prism with dimensions of 200 mm×200 mm×100 mm, with a total chloride content of 0.4%, which is considered the typical chloride threshold value for corrosion in reinforced concrete (RC) structures. As shown in FIGS. 2A and 3A, the corrosion current and potential are highest in the completely sealed specimens due to the complete unavailability of oxygen. This resulted in the poor formation of a passive layer, thus leading to the expected highest corrosion rates. This was followed by the bitumen-based curing compound (C2) yielding the second highest corrosion rate due to the nature of this curing compound being based on bitumen. This was followed by the wax-based curing compound (C3) and the paraffin emulsion-based curing compound (C1), which show intermixing in the graphs as a function of time, leading to a lack of clarity regarding which curing compound may perform better. However, it can be clearly seen that the 90% application of the curing compounds yielded a relatively better passage of oxygen, which produced lower corrosion rates. The specimens submerged under water during the curing period produced the second lowest corrosion rates due the availability of dissolved oxygen in the curing water tanks. The unsealed specimens produced the lowest corrosion current and potential due to the availability of sufficient quantities of oxygen throughout the curing period.

FIGS. 2B, 2C, 3B and 3C show an increasing trend in the corrosion current and potential with a reduced effect of the curing compounds on the blockage of oxygen reaching the rebars embedded in the concrete through the curing compound. This indicates that the effect of the curing compounds on the oxygen-based deprivation of the passive layer is more prone in the case of lower water-to-cement (W/C) ratios, since they have reduced porosity and increased tortuosity of capillary pores. This indicates the desirability of the present method, which allows for increased oxygen penetration coupled with the preservation of moisture in the concrete.

Figure 4A:
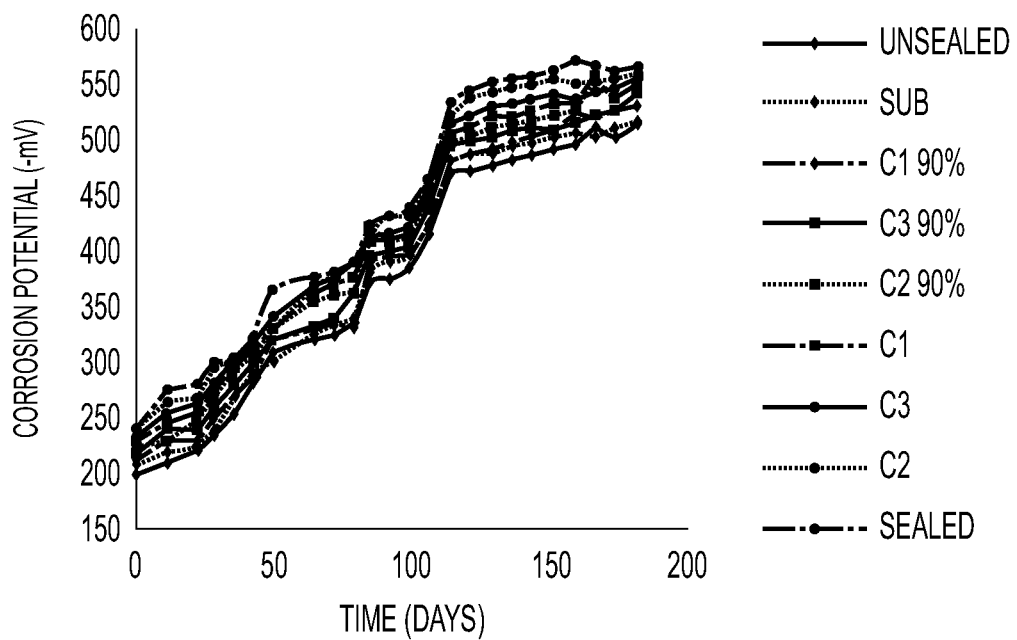
FIG. 4A is a plot of corrosion potential as a function of time (in days) for reinforced concrete samples treated by the method of curing reinforced concrete, including samples using different curing compounds, samples fully coated with the different curing compounds, for an entirely sealed sample, for a sample submerged in water, and for a completely uncoated control sample, where each reinforced concrete sample has a water-to-cement (W/C) ratio of 0.6 and was immersed in 5% NaCl brine solution.
Figure 4B:
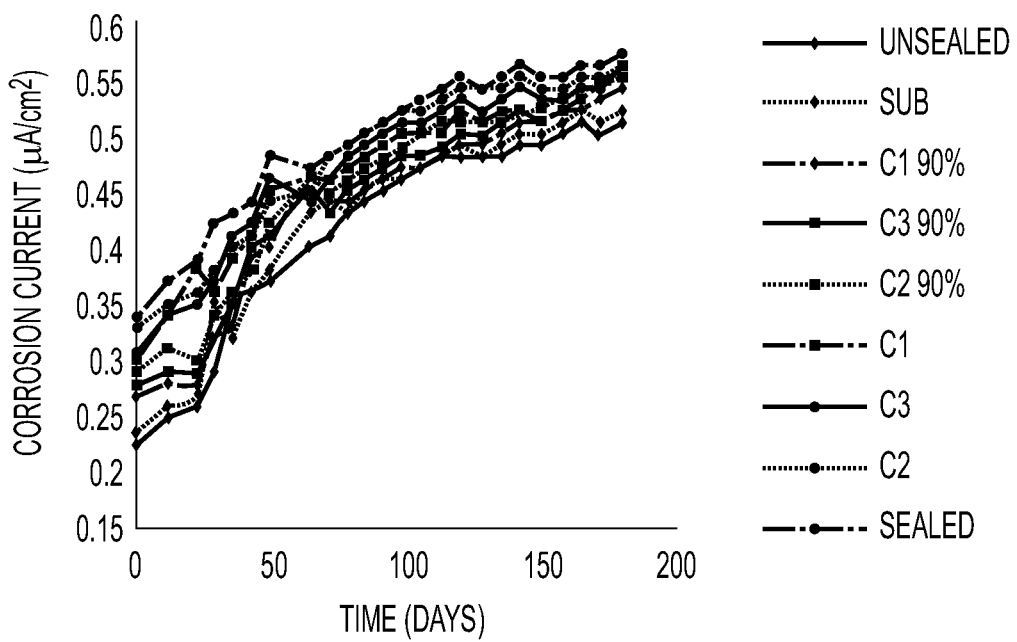
FIG. 4B is a plot of corrosion current as a function of time (in days) for reinforced concrete samples treated by the method of curing reinforced concrete, including samples using different curing compounds, samples fully coated with the different curing compounds, for an entirely sealed sample, for a sample submerged in water, and for a completely uncoated control sample, where each reinforced concrete sample has a water-to-cement (W/C) ratio of 0.6 and was immersed in 5% NaCl brine solution.
Figure 4C:
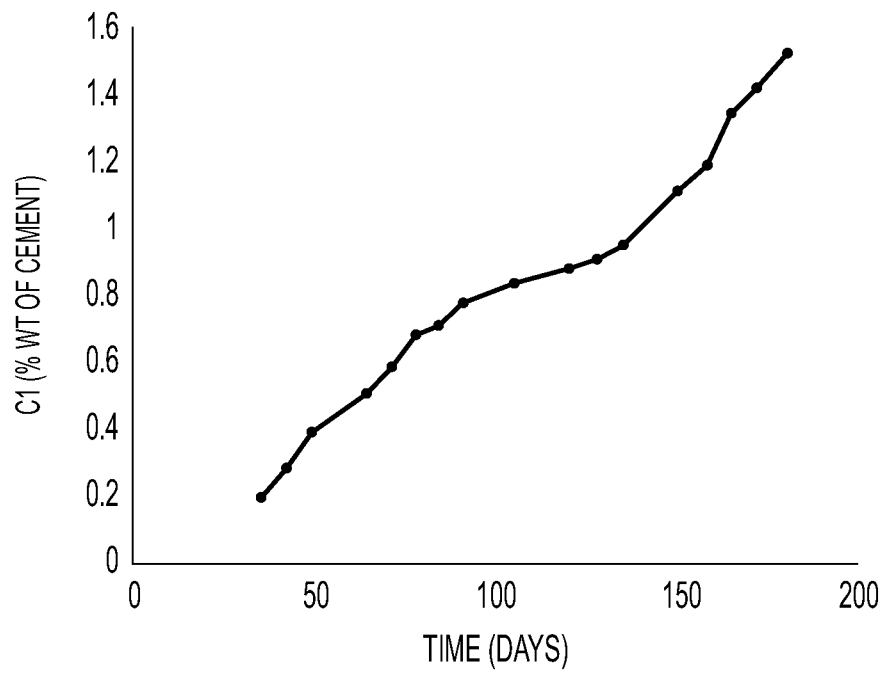
FIG. 4C is a plot showing the chloride penetration profile into the concrete of the samples of FIGS. 4A and 4B.

For the results of FIGS. 4A-4C, each reinforced concrete specimen was shaped as a rectangular slab with dimensions of 300 mm×300 mm×100 mm, and the samples were further immersed in 5% NaCl brine solution. With regard to FIGS. 4A-4C, it can be seen that the corrosion current and potential increased significantly (FIGS. 4A and 4B) with the ingress of chloride ions into the concrete specimens (FIG. 4C). The hierarchy of corrosion profiles was found to be similar to that of the admixed chloride specimens of FIGS. 2A-3C. The expected blockage of chloride ions due to the curing compound application on the concrete surface was not observed, and the results show an increase in corrosion rates with time, contrary to expectations. A possible reason for these results is the dissolution of the curing compound in the brine solution, allowing the chloride ions to penetrate into the concrete and reach the rebar surfaces. Additionally, the difference in the magnitude of corrosion for various cases was less than what was observed in the case of admixed chloride specimens (FIGS. 2A-3C). This also strengthens the dissolution of the curing compound into the brine. However, the trend between various cases was found to be similar to what was observed in the samples of FIGS. 2A-3C, thus providing further support for the desirability of the present method, which allows for increased oxygen penetration coupled with the preservation of moisture in the concrete.

Figure 5A:
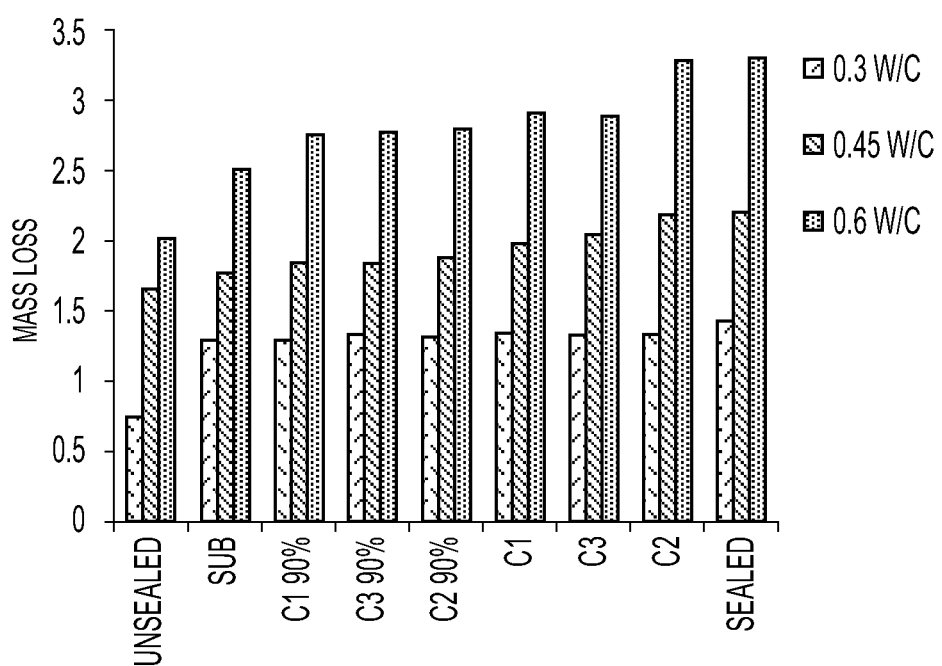
FIG. 5A is a chart showing the results of gravimetric mass loss analysis for the steel rebars of the samples of FIGS. 2A-3C.
Figure 5B:
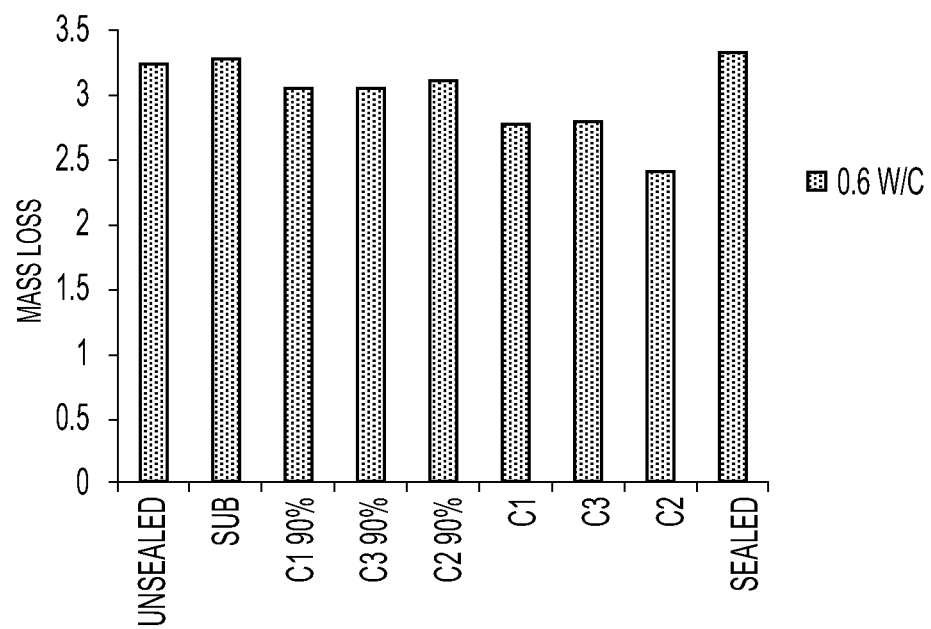
FIG. 5B is a chart showing the results of gravimetric mass loss analysis for the steel rebars of the samples of FIGS. 4A and 4B.

After 6 months of testing, the prism-shaped specimens of FIGS. 2A-3C were broken, and after 9 months of testing, the slabs of FIGS. 4A-4C were broken, allowing gravimetric corrosion analysis to be performed on the steel rebars embedded in the respective samples. Gravimetric mass loss analysis is considered to be the most reliable source of data for corrosion experimentation. FIGS. 5A and 5B show the mass loss data obtained by chemical cleaning of the corroded rebars. It can be seen in FIG. 5A that the highest corrosion mass loss was obtained in the case of the completely sealed specimens, followed by the curing compound C2 specimens with admixed threshold total chloride content of 0.4% (i.e., the specimens of FIGS. 2A-3C). It is noted that the curing compound C2 appeared to block the penetration of oxygen, similar to the non-porous plastic sheet used to seal the completely sealed specimen. This makes the curing compound C2 the worst selection when there is a choice available to select from the three available curing compounds.

The effect of the three W/C ratios was found to influence the sealed specimens and the specimens coated with the C2 curing compound in a similar way. The curing compounds C3 and C1 showed relatively lower corrosion rates than curing compound C2 and behaved similar to each other. However, the effect of W/C variation was obvious and greatly affected all of the curing compounds.

The 90% application of all three curing compounds C1, C2 and C3 appeared to allow the same amount of oxygen into the concrete to reach the rebar surface. The submerged and unsealed specimens showed relatively lower corrosion mass loss, with the unsealed specimen producing the lowest mass loss due to sufficient amounts of availability of oxygen for the formation of a quality passive layer.

FIG. 5B shows an unexpected trend for the corrosion mass loss results for the case of the specimens immersed in 5% brine solution (i.e., the specimens of FIGS. 4A-4C). It can be seen that the curing compound C2 showed the lowest corrosion mass loss, even less than that of the sealed specimen. One possibility for this result is that the bituminous layer in this curing compound provides limited penetration to the chloride ions in the brine solution. The curing compounds C1 and C3 showed higher mass loss, thus showing that the dissolution of these compounds in water was relatively higher than that of curing compound C2. All of the 90% surface application specimens showed a similar trend to those of the specimens of FIGS. 2A-3C (i.e., the specimens having admixed chloride concentrations). The submerged and sealed specimens showed a similar mass loss, showing sufficient availability of oxygen at the surface of the rebar. This indicates that a higher W/C ratio in the range of 0.6 can provide enough dissolved oxygen to reach the rebar surface through the larger capillary pores and with less tortuosity. Thus, the choice of curing compound and its method of application is more critical in relation to the quality of passive layer formation and successive corrosion rate when lower W/C ratios are used in RC structures.

It is to be understood that the method of curing reinforced concrete is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of curing reinforced concrete, comprising the steps of:
    applying a mask to at least one surface of a slab of reinforced concrete, the mask covering about 10% of the surface area of the at least one surface;
    coating, a first time, the at least one surface of the slab of reinforced concrete with a liquid membrane-forming curing compound to provide a first coating;
    coating, a second time, the at least one surface of the slab of reinforced concrete with a liquid membrane-forming curing compound applied at right angles to the first coating;
    drying the liquid membrane-forming curing compound to form a curing compound layer on the about 90% unmasked area of the at least one surface of the slab of reinforced concrete; and
    removing the mask from the at least one surface of the slab of reinforced concrete to form at least one uncoated region on the at least one surface of the slab of reinforced concrete,
    wherein the at least one uncoated region on the at least one surface of the slab allows environmental oxygen to permeate into the slab of reinforced concrete to effect passive layer formation on steel rebar embedded in the reinforced concrete.

2. The method of curing reinforced concrete as recited in claim 1, wherein the step of applying a mask to the at least one surface of the slab of reinforced concrete comprises partially covering the at least one surface of the slab of reinforced concrete with adhesive tape.

3. The method of curing reinforced concrete as recited in claim 1, wherein the liquid membrane-forming compound comprises a curing compound selected from the group consisting of a paraffin emulsion-based liquid membrane-forming curing compound, a bitumen-based liquid membrane-forming curing compound, and a wax-based liquid membrane-forming curing compound.

4. Reinforced concrete made according to the method of claim 1.

* * * * *